United States Patent [19]

James

[11] 4,026,105

[45] May 31, 1977

[54] JET ENGINE THRUST REVERSER

[75] Inventor: Varnell L. James, Auburn, Wash.

[73] Assignee: The Boeing Company, Seattle, Wash.

[22] Filed: Mar. 25, 1975

[21] Appl. No.: 561,920

[52] U.S. Cl. .............................. 60/226 A; 60/229; 60/230; 239/265.29; 239/265.31; 239/265.39; 239/265.43

[51] Int. Cl.² .......................................... F02K 3/02

[58] Field of Search ............... 60/226 A, 228, 229, 60/226 R, 230, 232; 239/265.33, 265.37, 265.39, 265.41, 265.25, 265.27, 265.29

[56] References Cited

UNITED STATES PATENTS

| | | | |
|---|---|---|---|
| 2,697,907 | 12/1954 | Gaubatz | 60/230 |
| 2,945,346 | 7/1960 | Arnzen | 60/228 |
| 3,040,524 | 6/1962 | Kurti | 60/226 A |
| 3,292,880 | 12/1966 | Kutney | 244/12 |
| 3,434,666 | 3/1969 | Shaw | 239/265.37 X |
| 3,441,219 | 4/1969 | Turner | 244/12 |
| 3,475,913 | 11/1969 | Mortlock | 60/226 A |
| 3,610,533 | 10/1971 | Johnson | 60/232 |
| 3,612,209 | 10/1971 | Vdoviak | 60/232 |
| 3,612,400 | 10/1971 | Johnson | 239/265.33 |
| 3,690,562 | 9/1972 | Smale | 239/265.29 |
| 3,747,341 | 7/1973 | Davis | 60/226 A |
| 3,769,797 | 11/1973 | Stevens | 60/226 R |
| 3,794,246 | 2/1974 | Weise | 60/229 |
| 3,824,785 | 7/1974 | Soligny | 60/226 A |
| 3,892,358 | 7/1975 | Gisslen | 239/265.39 |

FOREIGN PATENTS OR APPLICATIONS

1,294,283  5/1969  Germany .................. 60/226 A

Primary Examiner—Clarence R. Gordon
Attorney, Agent, or Firm—Christensen, O'Connor, Garrison & Havelka

[57] ABSTRACT

A thrust reverser cascade section comprising a plurality of cascade windows mounted in an engine nacelle rearwardly of the fan air compressor, each cascade window including a plurality of cascade elements, is disclosed. The cascade elements are rotatable through an arc of 90°, more or less, between closed and open positions, along axes lying generally parallel to the longitudinal axis of the nacelle. The cascade elements include deflecting vanes and are generally S-shaped when viewed in cross-section. Adjacent cascade elements abut one another in both their open and closed positions. Seals are located in the regions of abutment. The vanes direct fan air flow from the fan air duct toward the front of the nacelle when the cascade elements are in their open position. Each cascade window also includes sealing end plates adapted to move into and out of sealing relationship with the cascade elements to seal the ends when the cascade elements are closed. A fan duct blocking section comprising a plurality of cooperating doors that move between a fan air duct open position and a fan air duct closed position is also disclosed. The doors are movable rearwardly from their open to their closed positions and vice versa. As they move rearwardly, they also contract inwardly. In one form, contraction is provided by the rearward portion of adjacent doors moving together in a fan-like manner. In an alternative form, the doors are hinged together in a manner such that a portion of the doors fold in an accordion-like manner.

32 Claims, 24 Drawing Figures

JET ENGINE THRUST REVERSER

BACKGROUND OF THE INVENTION

This invention is directed to jet engines and, more particularly, to thrust reversers for jet engines. While the invention finds its primary use in reversing the fan air flow of a fan jet engine, and is mainly described in such an environment, it will be appreciated that it can be used in other environments and for other purposes. For example, it can be used in a STOL (short take-off and landing) aircraft environment to assist in primary air flow control, as hereinafter described.

Various types of apparatus have been proposed for reversing the thrust of jet engines. One of the most common devices for reversing the fan air flow of a fan jet engine includes cascades formed in the engine nacelle and a means for exposing the cascades when reverse thrust is desired, in combination with a mechanism for blocking fan air flow in the fan air duct rearwardly of the cascades. In general, such prior art devices expose the cascades by moving or retracting a cover, usually formed of a heavy ring surrounding the nacelle, rearwardly. As the cover is retracted rearwardly, blocker doors are moved to a position whereat they block the normal fan air duct outlet. One of the major disadvantages of this structure is the weight created by the relatively heavy cover utilized to control the exposure of the open cascades and the heavy mechanism needed to operate the cover. A further disadvantage relates to the length of the path of travel traversed by the cover. Specifically, because the longitudinal distance of this path is substantial, it places undesirable restrictions on engine design.

Various proposals have been made to overcome the foregoing disadvantages. In this regard, it has been proposed to expose or open a plurality of cascade elements by rotating them between open and closed positions rather than withdrawing a cover ring. When such cascade elements are rotated to their open position, they define flow paths that direct fan air from the fan air duct toward the front of the engine nacelle, i.e., they reverse fan air flow. An example of such a system is described in U.S. patent application 521,264, entitled "Jet Engine Thrust Reverser" by Claude R. Stachowiak, filed Nov. 6, 1974 and assigned to the assignee of the present application. While this and other similar prior art systems propose an alternative to the mechanism of more classical thrust reversers, they also have certain disadvantages. This invention is directed to overcoming these disadvantages.

Therefore, it is an object of this invention to provide a new and improved air flow control mechanism.

It is another object of this invention to provide a new and improved exhaust air flow control mechanism for a jet engine.

It is also an object of this invention to provide a new and improved rotatable cascade element thrust reverser for use in reversing the fan air flow of a jet engine.

One of the major disadvantages of previously proposed rotatable cascade mechanisms relates to the difficulty of sealing the cascade elements, particularly when they are in their closed position. More specifically, if the cascade elements are not adequately sealed, fan air will escape from the fan air duct in the region of the cascade elements when such escape is undesired; specifically, when the cascade elements are in their closed position.

Therefore, it is a further object of this invention to improve the sealing of rotatable cascade element thrust reversers.

Another problem with prior art rotatable cascade element thrust reversers, also related to sealing, is the prior art's failure to provide a sealing mechanism that provides for venting fan air in the region of the cascade elements just prior to their being rotated open. More specifically, the internal pressure on closed, rotatable cascade elements, created by fan air, tends to lock them closed. Obviously, either the forces creating this pressure must be reduced or the cascade elements must have structural strength (and be driven by a power source) adequate to withstand such forces.

Therefore, it is an object of this invention to provide a sealing mechanism suitable for sealing rotatable cascade elements that provides for venting in the region surrounding the cascade elements and, thereby, reduces the fan air force applied to the cascade elements.

Another prior art disadvantage of some rotatable cascade thrust reversers relates to their basic cross-sectional configuration. In this regard, it will be appreciated by those skilled in the art that certain cascade opening size criteria must be met in order to avoid undesirable pressure buildups during thrust reversal. Some prior art proposals for rotatable cascade thrust reversers have not been able to meet these criteria when reduced to practical embodiments.

Therefore, it is another object of this invention to provide a rotatable cascade element thrust reverser wherein the cascade elements have an adequately large exhaust opening size.

A still further disadvantage of many prior art systems of the type contemplated by the invention is their requirement that they be adjusted while affixed to their associated jet engine, rather than being adjusted at some remote (bench) location.

Therefore, it is still a further object of this invention to provide a rotatable cascade element thrust reverser formed in a manner such that it can be removed and adjusted at a remote location.

Another problem with prior art thrust reversers of various types relates to the nature and complexity of the blocker doors used to block the fan air duct during thrust reversal.

Therefore, it is still another object of this invention to provide new and improved blocker doors for a thrust reverser suitable for use in combination with a jet aircraft engine.

It is a still further object of this invention to provide new and improved blocker doors suitable for use in the fan air duct of a turbofan engine that are uncomplicated, yet are readily movable between open and closed position.

SUMMARY OF THE INVENTION

In accordance with principles of this invention, a rotating cascade element thrust reversing system for reversing the flow direction of the fan (or other) air of a fan jet engine is provided. In its principal form, the thrust reversing system includes a cascade section and a blocking door section. The cascade section comprises a plurality of cascade windows. Each cascade window is an integral unit and is mounted in the engine nacelle rearwardly of the fan air compressor.

In accordance with further principles of this invention, each cascade window includes a plurality of cascade elements mounted in a frame. Each cascade element is rotatable through an arc of 90°, more or less, between closed and open positions, along axes lying generally parallel to the longitudinal axis of the engine nacelle. The cascade elements are S-shaped in cross-section and abut one another. Seals are located in the abutment regions.

In accordance with other principles of this invention, end sealing mechanisms are located at both the front and rear ends of each cascade window. Preferably, each end sealing mechanism comprises a plate that is movable between a closed position whereat it seals the ends of the associated cascade elements, and an open position whereat it allows air to be vent from the fan air duct at the front and rear ends of the cascade windows, i.e., a vent gap or slot is opened.

In accordance with still other principles of this invention, a common mechanical mechanism performs both the function of moving the end sealing plates between their open and closed positions and the function of rotating the cascade elements between their open and closed positions.

In accordance with further principles of this invention, the common mechanical mechanism comprises a plurality of shafts, one lying along an extension of the longitudinal axis of rotation of each cascade element, and a sleeve surrounding each shaft. The sleeves associated with each cascade element of a cascade window are attached together and a driving source, directly connected to one sleeve, rotates all of the elements of one cascade. The sleeves are pinned to their associated shafts in a manner such that rotation of the sleeves in one direction first moves the sleeve longitudinally with respect to the shaft, and thereafter rotates the shaft; and, vice versa in the other rotational direction. The longitudinal sleeve movement moves the end plates between their open and closed positions, and the rotational movement of the shafts rotates their associated cascade elements between their open and closed positions.

In accordance with yet further principles of this invention, the fan duct blocking section comprises a generally cylindrically shaped door formed of interconnected sections and a door moving mechanism. When the door is in its open position, it is ring-shaped and forms a portion of the outer wall of the fan air duct. When in its closed position, the door is cone-shaped and blocks the fan air duct immediately rearwardly of the cascade sections.

In accordance with yet still further principles of this invention, the interconnected sections making up the door are hinged together in a somewhat accordion-like manner that allows the rear peripheral distance of the door to decrease as the door moves inwardly.

In accordance with alternate principles of this invention, the interconnected door sections have two different shapes, one of the shapes is triangular and the other is trapezoidal. The triangular shapes are fanned into the trapezoidal shapes in a manner such that movement of the door between its open, ring-shaped configuration and its closed, cone-shaped configuration causes the rear end of the sections to converge inwardly with respect to one another.

It will be appreciated from the foregoing description that the present invention provides a new and improved rotatable cascade element thrust controller or reverser for jet engines. The inclusion of a sealing mechanism that allows venting of the cascade elements prior to their being open allows these elements to maintain their structural integrity without also requiring that they be unduly heavy. Because the cascade elements are S-shaped in cross-section, they provide a cross-sectional exhaust area adequate to fit within desired design criteria, whereby undesirable thrust reversal pressure buildups are avoided. In addition, because the cascade elements are preformed into cascade windows, they can be readily and easily adjusted prior to installation in the nacelle of an aircraft. Because they can be thus installed and removed in a manner somewhat similar to the installation and removal of any subassembly of an aircraft, aircraft "downtime" caused by damage or maladjustment of the cascade elements is very short, i.e., it is limited to the time it takes to remove and install a cascade window. Thus, the invention overcomes many of the problems of proposed prior art rotatable cascade element thrust reversers of a generally similar nature. In addition, the invention provides unique fan duct blocking doors that readily and rapidly close the fan air duct rearwardly of the cascade elements, when desired, in a mechanically uncomplicated manner. Moreover, in addition to complete thrust reversal, the cascade windows can be operated in combination with the fan duct blocking section to provide a controlled amount of thrust reversal. Finally, the cascade windows can also be used, if appropriately positioned, to control the reversal of primary air flow. Thus, the invention is useful in various environments.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figures 1, 2:
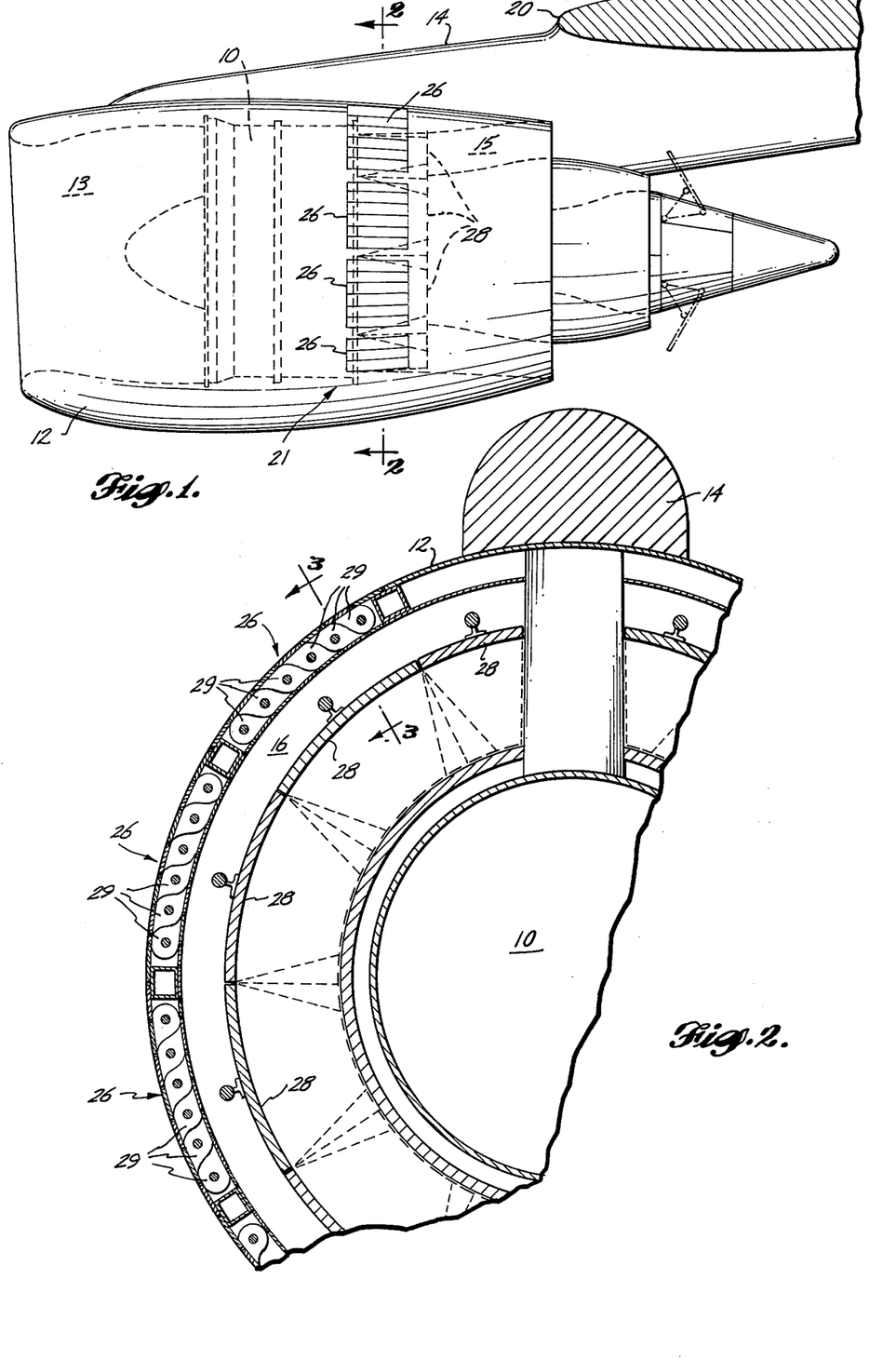
FIG. 1 is a side elevational view of a pod-mounted, turbofan jet engine incorporating the thrust reverser of the invention.
FIG. 2 is a partial cross-sectional view of FIG. 1 along line 2—2.

FIG. 1 illustrates a turbofan jet engine 10 suspended from a wing 18 via a strut 14. The engine 10 is encased in a nacelle 12. The strut 14 is designed and positioned such that the engine is located generally forward of, and beneath, the leading edge 20 of the wing 18. The nacelle 12 surrounds the engine 10 in a conventional manner such that its inner wall defines the outer wall of an air intake duct 13 and a fan air duct 15. The turbofan jet engine 10 includes a high pressure section and a fan air section, both receiving air from the air intake duct 13. The fan air section emits a fan air exhaust into the fan air duct 15.

FIG. 1 also illustrates the location of a jet engine thrust reverser 21 formed in accordance with the invention. The illustrated jet engine thrust reverser 21 comprises: a cascade section comprising a plurality of cascade windows 26; and, a fan air duct blocking section comprising a plurality of blocker doors 28, and other mechanisms. As best illustrated in FIG. 2, the cascade windows 26 are mounted in the outer wall, and the blocker doors 28 are mounted in the inner wall, of the nacelle 12. Both the cascade windows 26 and the blocker doors 28 are located immediately rearwardly of the rear end of the fan air section of the turbofan jet engine 10.

As will be better understood from the following description of a preferred embodiment of the cascade windows 26, each cascade window comprises a plurality of cascade elements 29 that are rotatable between open and closed positions. When in the closed position, the cascade elements are positioned such that they prevent fan air flow reversal. When in the open position, the cascade elements provide pathways for fan air flow reversal, i.e., fan air flow toward the front of the nacelle 12. Similarly, the blocker doors 28 are movable between open and closed positions. When in their closed position, the fan air duct blocking sections form a ring, the ring forming a portion of the outer wall of the fan air duct 15. When in their open position, the fan air duct blocking section defines a cone that blocks the fan air duct rearwardly of the location of the cascade windows 26. (It will be noted from this description that the words "open" and "closed", as used herein, refer to thrust reversal positions, i.e., open = thrust reversal, closed = no thrust reversal.)

Figure 3:
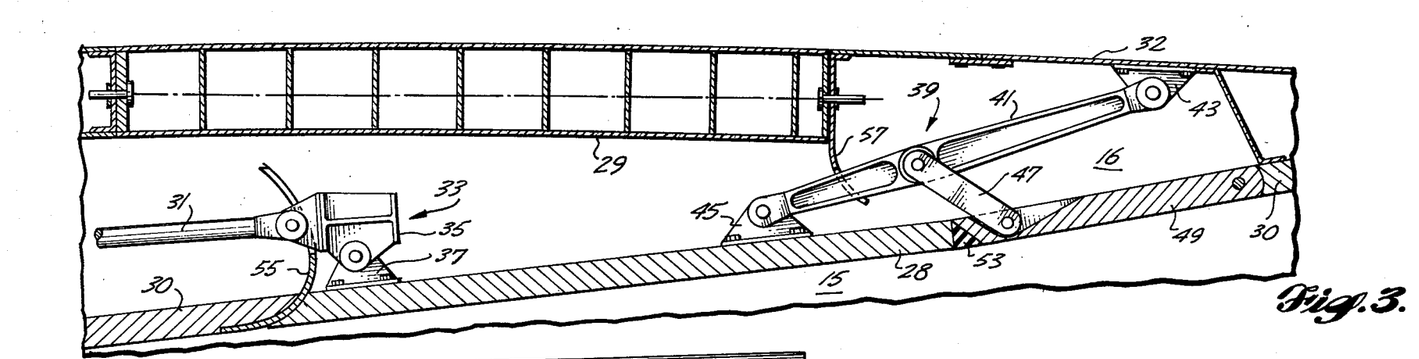
FIG. 3 is a cross-sectional view along line 3—3 of FIG. 2 illustrating a cascade element and a blocker door section in their nonthrust reversal (closed) positions.
Figure 4:
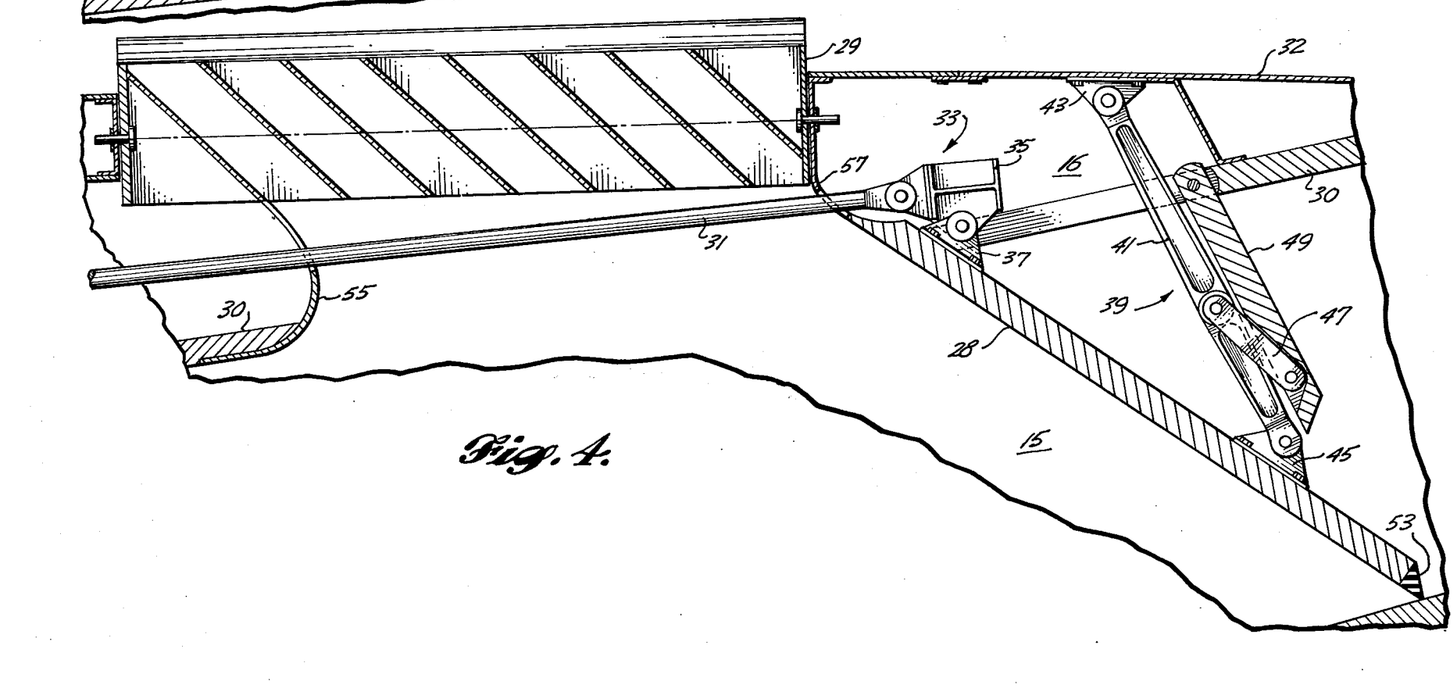
FIG. 4 is a cross-sectional view along line 3—3 of FIG. 2 illustrating a cascade element and a blocker door section in their thrust reversal (open) positions.

FIGS. 3–8 are directed to the fan air duct blocking section of the invention. FIGS. 3 and 4 illustrate a blocker door 28 in its closed and open positions, respectively. In addition, FIGS. 3 and 4 illustrate the orientation and location of the blocker doors 28 with respect to a cascade element 29, and the cascade element in its closed and open positions, respectively.

Figure 5:
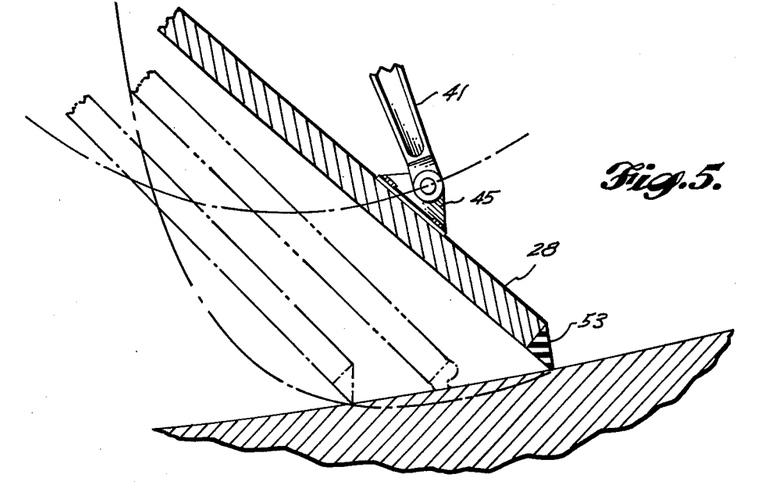
FIG. 5 is a partial cross-sectional view illustrating the rear tip of a blocker door as it moves into its fan air duct blocking position.

The blocker doors 28, as best seen in FIG. 2, have a cross-sectional curvature when viewed in a plane orthogonal to the longitudinal axis of the nacelle 12. As illustrated in FIG. 5, they are also trapezoidal in shape with the larger edge located toward the front of the nacelle. In addition to the blocker doors 28, the fan air duct blocking section also includes a collapsing mechanism located between adjacent blocker doors and a mechanical system affixing the blocker doors to the nacelle and to a suitable actuator (or actuators) that is adapted to move them between their open and closed positions.

The actuators (not illustrated) may be pneumatic, electrical or hydraulic mechanisms adapted to move a longitudinally movable shaft 31. The shafts 31 are located in the engine nacelle 12, between its inner and outer walls, 30 and 32, and project rearwardly. The rear end of the shafts 31 are attached to the forward ends of the blocker doors by hinge mechanisms 33. The hinge mechanisms 33 may include end plates 35 attached to the ends of the shafts 31, the end plates in turn, being rotatably attached to flanges 37 affixed to the blocker doors 28, and extending into the interior of the nacelle 12. As will be better understood from the following description, the hinge mechanisms 33 allow the blocker doors to rotate with respect to the shafts 31 as they are moved between their open and closed positions.

The rear ends of the blocker doors are supported by lever arm mechanisms 39. As illustrated, each lever arm mechanism 39 includes a main lever arm 41 rotatably attached at one end to a first flange 43 extending inwardly, into the space 16 between the inner and outer walls, 30 and 32, of the nacelle 12. A second flange 45, affixed to the blocker door 28, near the rear end thereof so as to extend inwardly into the space 16 formed between the inner and outer walls of the nacelle 12, is rotatably attached to the other end of the main lever arm 41. The positioning of the first and second flanges 43 and 45 is such that the lever arm 41 extends rearwardly from the second flange 45, and slightly outwardly with respect to the longitudinal axis of the nacelle.

Each lever arm mechanism 39 also includes a secondary lever arm 47 having one end rotatably attached to the main lever arm 41 at some point between its ends. The other end of the secondary lever arm 47 is attached to the front end of a narrow door 49. The narrow door 49 forms part of the inner wall 30 of the nacelle and extends rearwardly from the blocker door 28 with which it is associated. The rear end of the narrow door 49 is hinged to the inner wall of the nacelle 12. The narrow door 49 and the blocker door 28 meet at an inclined abutment, the inclined abutment lying in a plane that extends outwardly and forwardly with respect to the longitudinal axis of the engine nacelle. Affixed to the rear end of the blocker door 28 over its entire length, including the region where it abuts the narrow door 49, is a compressible seal 53.

In operation, as illustrated in FIGS. 3 and 4, when the actuator shaft 31 is moved rearwardly by its associated actuator, the lever arm mechanism 39 forces the rearward edge of the blocker door 28 to move inwardly (downwardly as viewed in FIGS. 3 and 4). The lever arm mechanism 39 also rotates the narrow door 49 rearwardly, via the secondary lever arm 47. Thus, as the blocker door 28 is moved rearwardly, it is also moved inwardly toward the interior wall of the fan air duct 15. At the end of their paths of travel, the fan air duct is entirely blocked by the plurality of blocker doors 28.

As illustrated in FIG. 5, movement of the blocker doors 28 through their paths of travel causes the compressible seals 53 to compress as they meet the inner wall of the fan air duct 15. At the end of the blocker doors' paths of travel, the compression force may decrease slightly, as also illustrated in FIG. 5, depending upon the nature of the inner wall of the fan air duct. In any event, the terminal amount of compression force is adequate to create a tight seal between the rear edges of the blocker doors 28 and the inner wall of the fan air duct 15.

Curving outwardly and forwardly from the inner wall 30 of the nacelle 12 from the point where it intersects the blocker doors 28 is a front vane 55. The inner edge of the front vane 55 intersects the hereinafter described front vanes of the cascade elements, when the cascade elements are in their open position. Curving outwardly and rearwardly from the rear edge of the cascade elements 29 is a rear vane 57. The rear vane 57 intersects the forward edge of the blocker doors 28 when they are in their fan air duct blocking position. The front and rear vanes direct fan air from the fan air duct toward the cascade elements 29 and prevent such air from flowing between the inner and outer walls of the nacelle 12.

Figure 6:
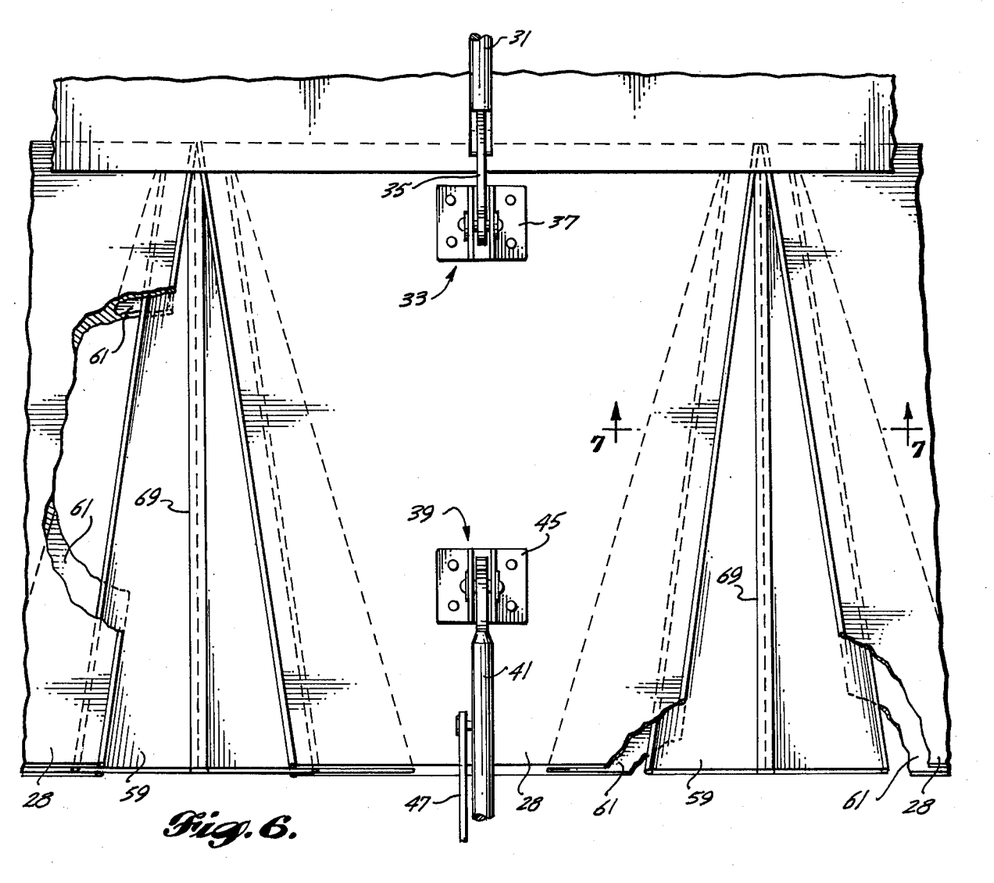
FIG. 6 is a partial plan view of a blocker door section formed in accordance with the invention.
Figure 7A:
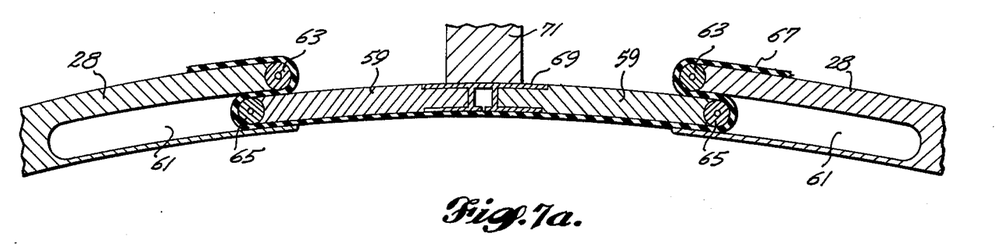
FIGS. 7a and 7b are partial cross-sectional views along lines 7—7 of FIG. 6 illustrating the blocker door section in its closed and open positions, respectively.
Figure 7B:
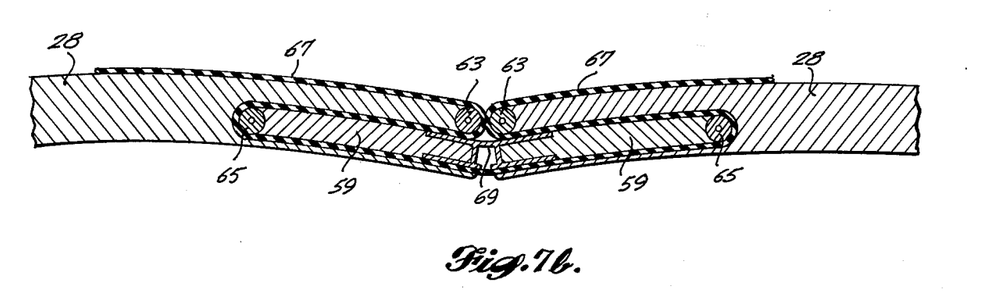
Figure 8A:
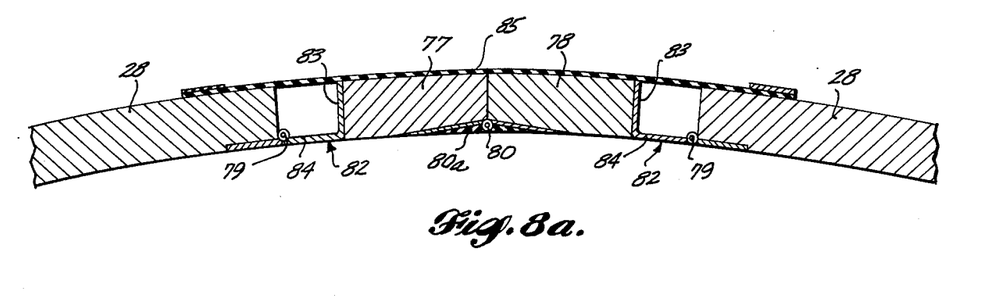
FIGS. 8a and 8b are partial cross-sectional views illustrating an alternate blocker door section formed in accordance with the invention in its closed and open positions, respectively.
Figure 8B:
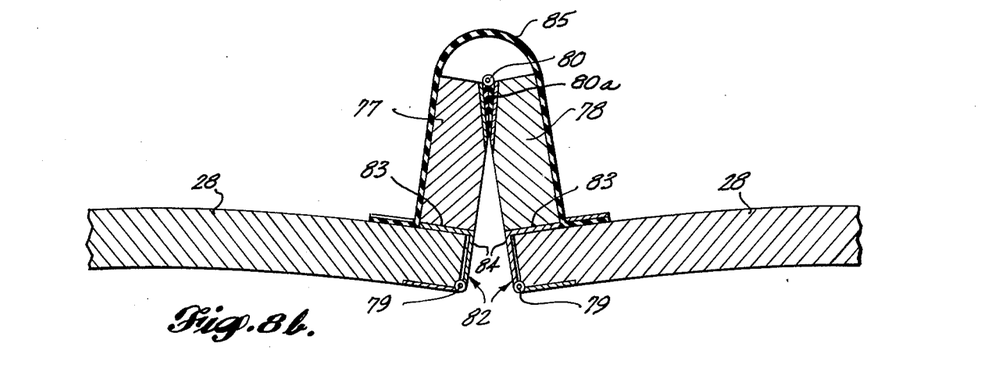

As briefly noted above, and as will be appreciated from the foregoing description and viewing FIGS. 1–4, the length of the rear edge of the fan air duct blocking section, which includes the blocking doors 28 as a portion thereof, must decrease as the blocking doors move from their closed (fan air duct open) to their open (fan air duct closed) positions. FIGS. 6, 7a and 7b illustrate one collapsible mechanism, and FIGS. 8a and 8b illustrate an alternative collapsible mechanism, for accomplishing this result.

In the FIGS. 6, 7a and 7b structure, curved, triangular intermediate doors 59 are located between adjacent blocker doors 28, which, as noted above, have a curved, trapezoidal shape. One tip of the intermediate doors 59 is located toward the front of the engine nacelle and the opposite edge is located toward the rear of the engine nacelle. The other two edges of the intermediate doors 59 lie in slots 61 formed in adjacent edges of the blocker doors 28. As best illustrated in FIGS. 7a and 7b, the intermediate doors 59 are substantially thinner than the blocker doors 28.

In operation, as the blocker doors 28 are moved rearwardly and inwardly, the intermediate doors 59 slide into the slots 61 whereby the rear edge peripheral distance of the overall fan duct blocking section decreases. The opposite action (increase in rear edge peripheral distance) occurs when the blocker doors return to their closed position.

It will be appreciated by those skilled in the aircraft art that it is necessary that the junction between the intermediate doors 59 and the blocker doors 28 be tightly sealed in order to prevent leakage of fan air through the overall fan air duct blocking section. The invention provides for a seal that accomplishes this result. Specifically, located along the edges of the blocker doors 28 on the side of the intermediate doors 59 remote from the fan air duct 15 are cylindrical rollers 63. Similarly, located along each of the "slot" edge of the intermediate door 59 is a cylindrical roller 65. An elastomeric sheet of material 67 (omitted from FIG. 6 for clarity) winds about the rollers, over the duct side of the intermediate doors 59 and over the interior side of the blocker doors 28. The elastomeric sheet fills the region between the intermediate doors 59 and the blocker doors 28 and, thus, forms a seal between these elements. When the fan duct blocking section is moved from its closed (fan duct open) position to its open (fan duct closed) position, and the intermediate doors 59 slide into their associated slots 61, the elastomeric sheet 67 stretches, as illustrated in FIG. 7b, to maintain the seal. Thus, a seal is provided in both extreme positions, and all positions therebetween.

The blocker doors 28 and the intermediate doors 59 both have aa radius of curvature that is equal to the radius of curvature of the inner wall 30 of the nacelle 12. Obviously, the inner wall of the fan air duct has a smaller average radius of curvature. Thus, when the blocker doors are in their open position, they diverge inwardly. Inward divergence is allowed by a flexible joint 69 located in the center of each intermediate door 59. The flexible joint extends longitudinally through each intermediate door 59 and is illustrated as formed of an elastomeric-like material having an I-shaped cross-sectional configuration. The leg of the I is a square tube that is split along its surface nearest to the fan air duct wall. As the blocker doors move into their fan air duct blocking position, and the intermediate doors slide into the slots 61, the split opens, whereby the intermediate door 59 becomes generally V-shaped in cross-section, as seen in FIG. 7b. The end seals 53, illustrated in FIGS. 3–5 and previously described, fill any curvature gaps that exist when the blocker doors 28 are in their fan air duct blocking position.

FIGS. 8a and 8b illustrate an alternative collapsible mechanism that allows the peripheral rear edge distance of the fan air duct blocking section to decrease in size as the blocker doors 28 are moved to their fan air duct blocking position. The FIGS. 8a and 8b mechanism is basically an accordion arrangement that includes accordion intermediate doors 75 located between pairs of adjacent blocker doors 28. The accordion intermediate doors 75 comprise two sections 77 and 78, which are mirror images of one another. While not specifically illustrated, when extended, the intermediate doors 75 are triangular in shape. The two sections 77 and 78 are hinged together along the corner of their adjacent edge located on their fan air duct side by a hinge 80 covered on the duct side by a double wedge-shaped seal 80a. In addition, they are hinged to their adjacent blocker doors 28 by hinges 79. The hinges 79, attaching the intermediate doors 75 to the blocking doors 28, include an L-shaped arm 82 having one leg 83 attached to the associated edge of the intermediate door 75. The outer edge of the other leg 84 of the L-shaped arm is hinged to the adjacent blocker door 28 along the corner of its edge nearest the fan air duct. The formation of the hinges 79 is such that they appear to be L-shaped in cross-section when the blocker doors are in their closed (fan air duct open) position. When the fan air duct blocker doors move to their open (fan air duct closed) position, the intermediate doors 75 hinge outwardly (toward the nacelle), as illustrated in FIG. 8b. When in the blocker door open position, the hinges 79 take on a U-shaped, cross-sectional configuration, also as illustrated in FIG. 8b.

Sealing is provided by an elastomeric sheet 85 that overlies the intermediate door 75 and is attached to the surfaces of the fan air duct blocking doors 28 facing the space between the inner and outer walls of the nacelle.

In summary, the fan air duct blocking section comprises a plurality of blocking doors having a curved, trapezoidal form. Located between the blocking doors are intermediate doors that either slide into the blocking doors, or collapse in an accordion manner, as the overall fan air duct blocking section is moved from its closed (fan air duct open) position to its open (fan air duct closed) position. Movement to the open position creates an aperture in the inner wall of the nacelle that allows fan air to flow to the herein described cascade element apertures. In addition, this movement of the fan air duct blocking section causes the fan air duct to be blocked rearwardly of the location of the cascade windows.

Figures 9A, 9B:
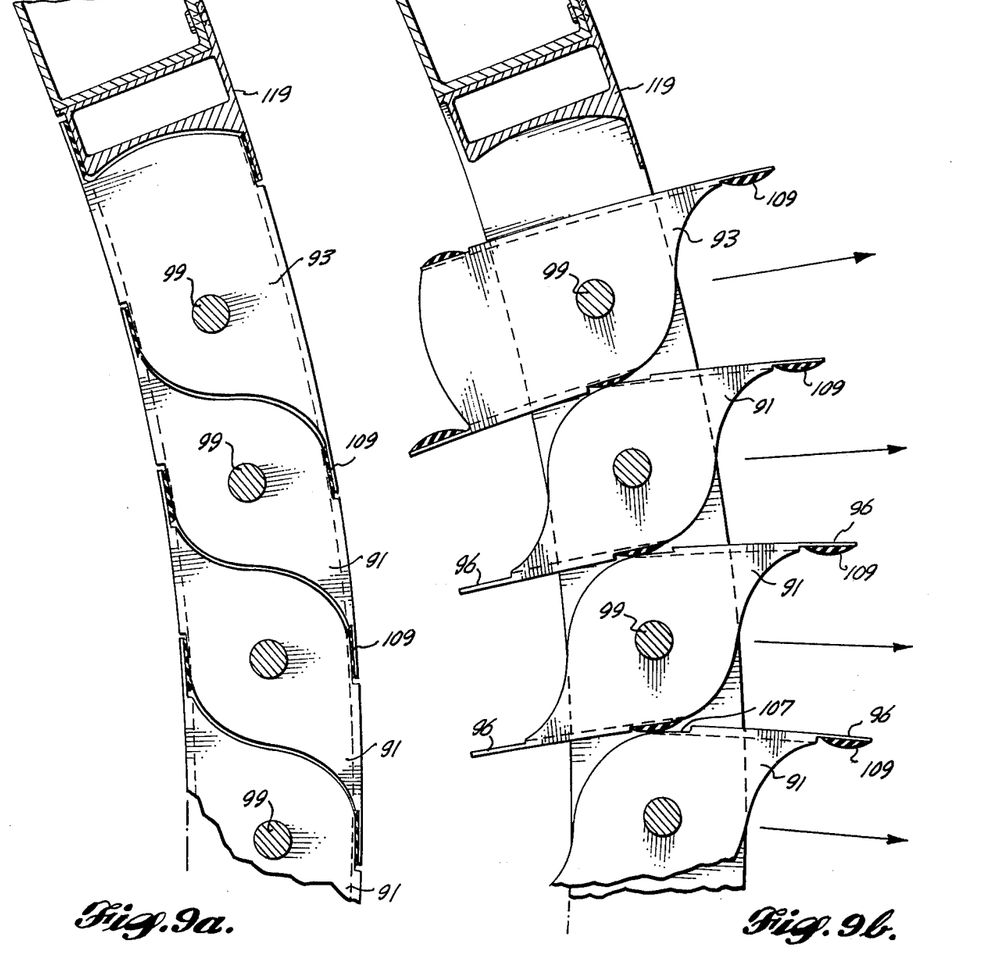
FIGS. 9a and 9b are cross-sectional diagrams of a portion of a cascade section formed in accordance with the invention illustrating cascade elements in ther closed and open positions, respectively.
Figure 10:
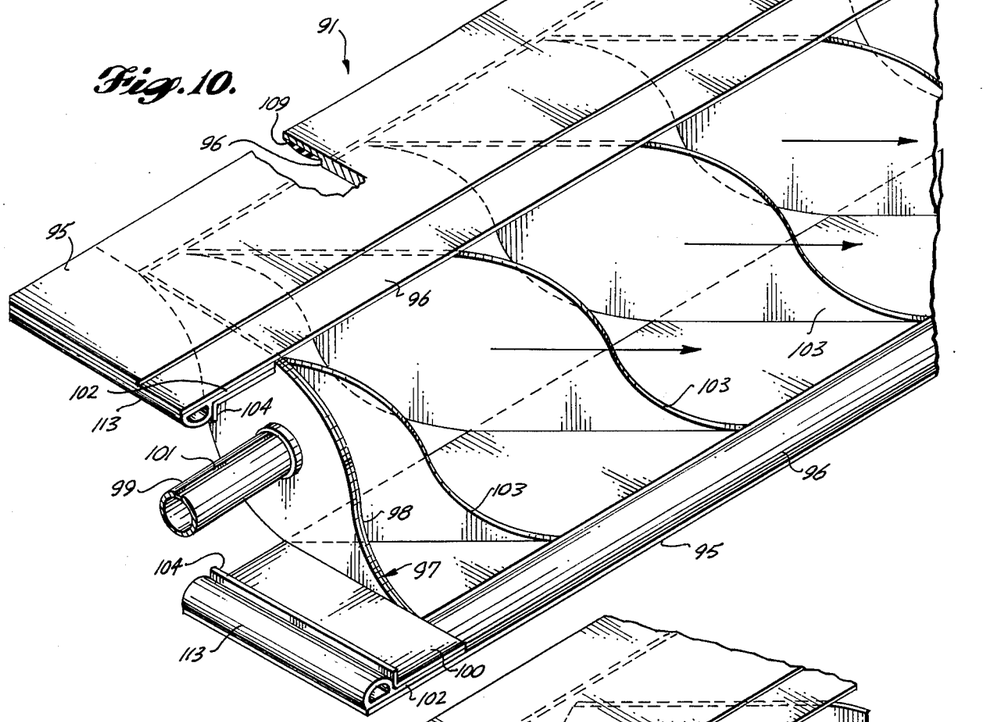
FIG. 10 is a partial perspective view of an intermediate cascade element formed in accordance with the invention.
Figure 11:
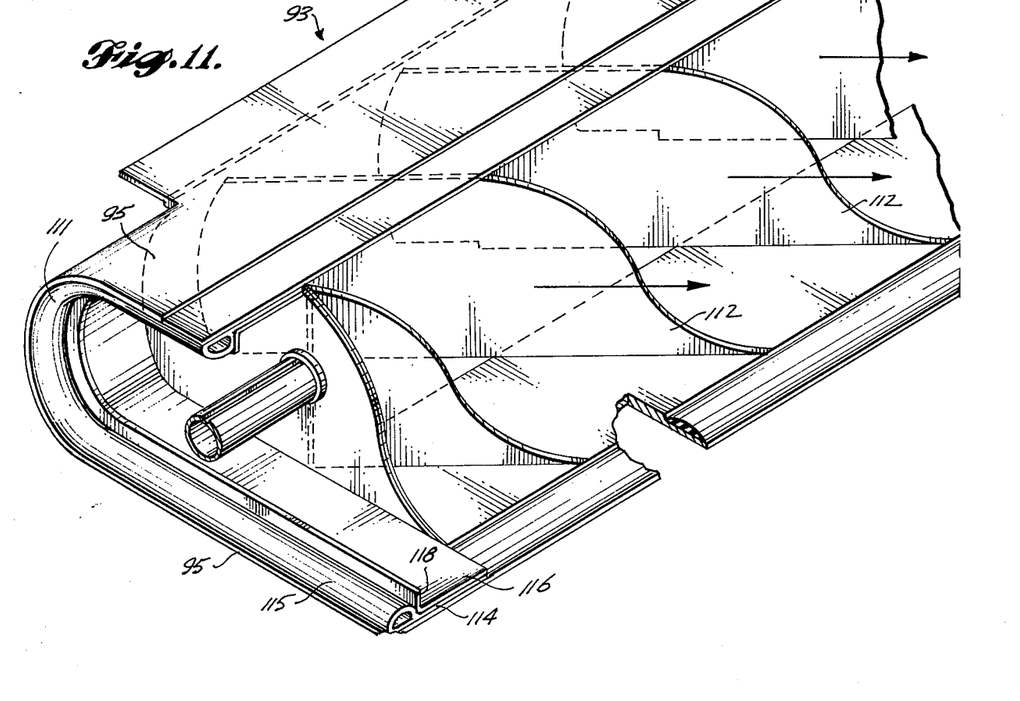
FIG. 11 is a partial perspective view of an end cascade element formed in accordance with the invention.

FIGS. 9a, 9b, 10 and 11 illustrate a preferred embodiment of the cascade windows 26. Each cascade window comprises a plurality of intermediate cascade elements 91 (FIG. 10) and a pair of end cascade elements 93 (FIG. 11).

Each intermediate cascade element 91 includes a pair of spaced, elongated, plates 95. The spaced, parallel plates 95 include undercut regions 96 along their long edges, on opposite faces. The space parallel plates 95 are attached together at each end by recessed end plate assemblies 97. The end plate assemblies comprise end plates 98 and generally U-shaped seal retaining plates 100. The end plates 98 are generally S-shaped, as is the connecting leg of the seal retaining plates 100, which are flush with the end plates. The legs of the seal retaining plates are spaced slightly from the outwardly extending ends of the parallel plates 95. Located in the thusly defined space are end seals 102. The formation is such that the end seals 102 are held in place by the legs of the seal retaining plate pressing the seal against the outwardly extending ends of the parallel plates 95. The legs of the seal retaining plates are recessed from the outer ends of the parallel plates, and include inwardly projecting flanges 104. The seals include elongated, hollow, bulbous sections 113 that lie in this recess region. The bulbous sections are pressed against the inwardly projecting flanges 104 when a hereinafter described end plate 117 is moved into a cascade window sealing position.

Projecting outwardly into the end recess located at either end of the cascade elements are shafts 99. The two shafts of each cascade element lie along a main longitudinal axis and each includes a keyway 101. The shafts are rotatably affixed to the end plate assemblies 97 by an adjustment mechanism illustrated in FIG. 12 and hereinafter described. This mechanism is not illustrated in FIGS. 9-11 for reasons of clarity.

Located between the end plate assemblies 97 and extending from one of the parallel plates 95 to the other are a plurality of vanes 103. The vanes lie in planes that are laterally disposed with respect to the main longitudinal axis defined by the shafts 99. The vanes are parallel to one another and the end vanes intersect the end plate assemblies. The vanes are also S-shaped and include parallel edges that are attached to the parallel plates 95 by rivets, welds, etc. Thus, as best illustrated in FIGS. 9a and 9b, the cross-sectional configuration of the intermediate cascade elements 91 is such that the parallel plates 05 extend outwardly from either side of the overall structure. The S-shaped overall structure is formed such that the outwardly extending parallel plates 95 form arms. When a series of cascade elements are mounted side-by-side to form a cascade window, the arms of one section overlie an adjacent section. The previously described undercut regions are formed such that adjacent abutting surfaces are flush when the cascade elements are in their arm overlying position. This position is the cascade window closed position. Affixed to one or the other of abutting undercut regions 96 is a seal strip 109.

The end cascade elements 93, illustrated in FIG. 11, are substantially identical to the intermediate cascade elements except that an enclosing end recess wall 111 joins the parallel plates 95. In addition, the vanes 112 include related ends that extend out to follow the curvature of the end recess wall 111. The end recess walls are located such that, when the cascade elements are in their closed position, an entirely circumscribed recess is formed at either end of the overall cascade window.

The recessed ends of the end cascade elements also include a seal 114, having a bulbous outer end 115, held in place by a seal retaining plate 116 having an inwardly projecting flange 118. When a cascade window is closed, a continuous seal formed of a plurality of bulbous end seals 102 and 114 affixed to the intermediate and end cascade elements, respectively, surrounds the outer, inner edge of the above described end recess.

The end and intermediate cascade elements 93 and 91 are rotatable about the longitudinal axes defined by their respective shafts 99 between their open and closed positions. When in their open position, the vanes 103 and 112 define a plurality of air flow passages, best seen in FIG. 4, that direct fan air from the fan air duct toward the front of the engine nacelle. Thus, fan air flow is reversed, assuming that the fan air duct blocker doors are in their open (fan air duct blocking) position.

As previously described, preferably, a plurality of cascade elements, mounted in a frame 119 (FIGS. 9a and 9b), form a cascade window. The cascade elements are mounted such that their shafts lie along parallel axes located along a curve as shown in FIGS. 9a and 9b. In addition to the cascade elements, each cascade window also includes a power source (motor) adequate to simultaneously rotate all of the cascade elements.

Figure 12:
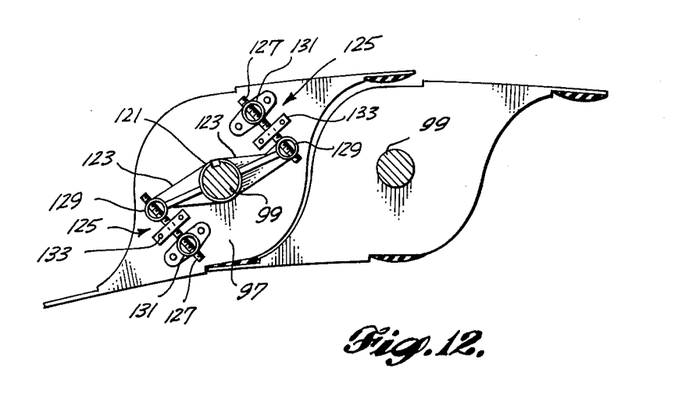
FIG. 12 is a plan view of an adjustment mechanism formed in accordance with the invention that allows the position of an individual cascade element to be adjusted with respect to other cascade elements.

In order to limit the down time of aircraft using the invention, a mechanism 125 for adjusting the position of the individual cascade elements making up a cascade window is provided. FIG. 12 illustrates a preferred form of this mechanism. As previously indicated, the shafts 99 include keyways 101. The mechanism for adjusting the cascade elements comprises an encircling collar 121 keyed to the associated shaft 99. A pair of diagonally opposed split arms 123 are affixed to, and project outwardly from, the collar 121. Affixed to the end of each split arm 123 is an end ring 129. A transversely mounted threaded shaft 127 passes through suitably threaded apertures in the end rings 129. Each transversely mounted threaded shaft also passes through a locking bracket 133 and a ring bracket 131. The locking and ring brackets are affixed to the end plate assembly 97 of the associated cascade element. In operation, end bolts 134 (FIG. 13) coaxial with the shafts 99 associated with a cascade element to be adjusted are loosened. The locking brackets are also loosened. Rotation of the transversely mounted threaded shafts, which may be slotted on one end so as to receive a screwdriver blade, then adjusts the rotational position of the shafts with respect to the cascade element. When the desired position is reached, the locking brackets are tightened to prevent further rotation of the threaded shafts, and then, the end bolts are retightened.

Figure 13:
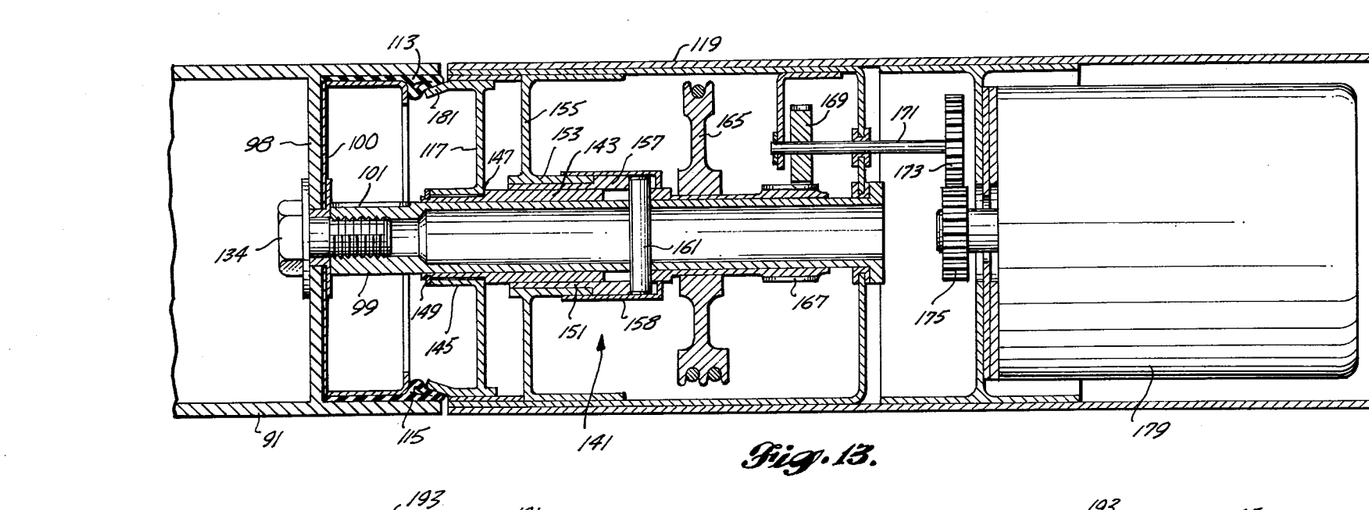
FIG. 13 is a cross-sectional view of an electromechanical mechanism formed in accordance with the invention for moving end sealing plates into and out of sealing relationship with the ends of cascade sections, and rotating cascade elements between their open and closed positions.
Figures 16A, 16B, 16C:
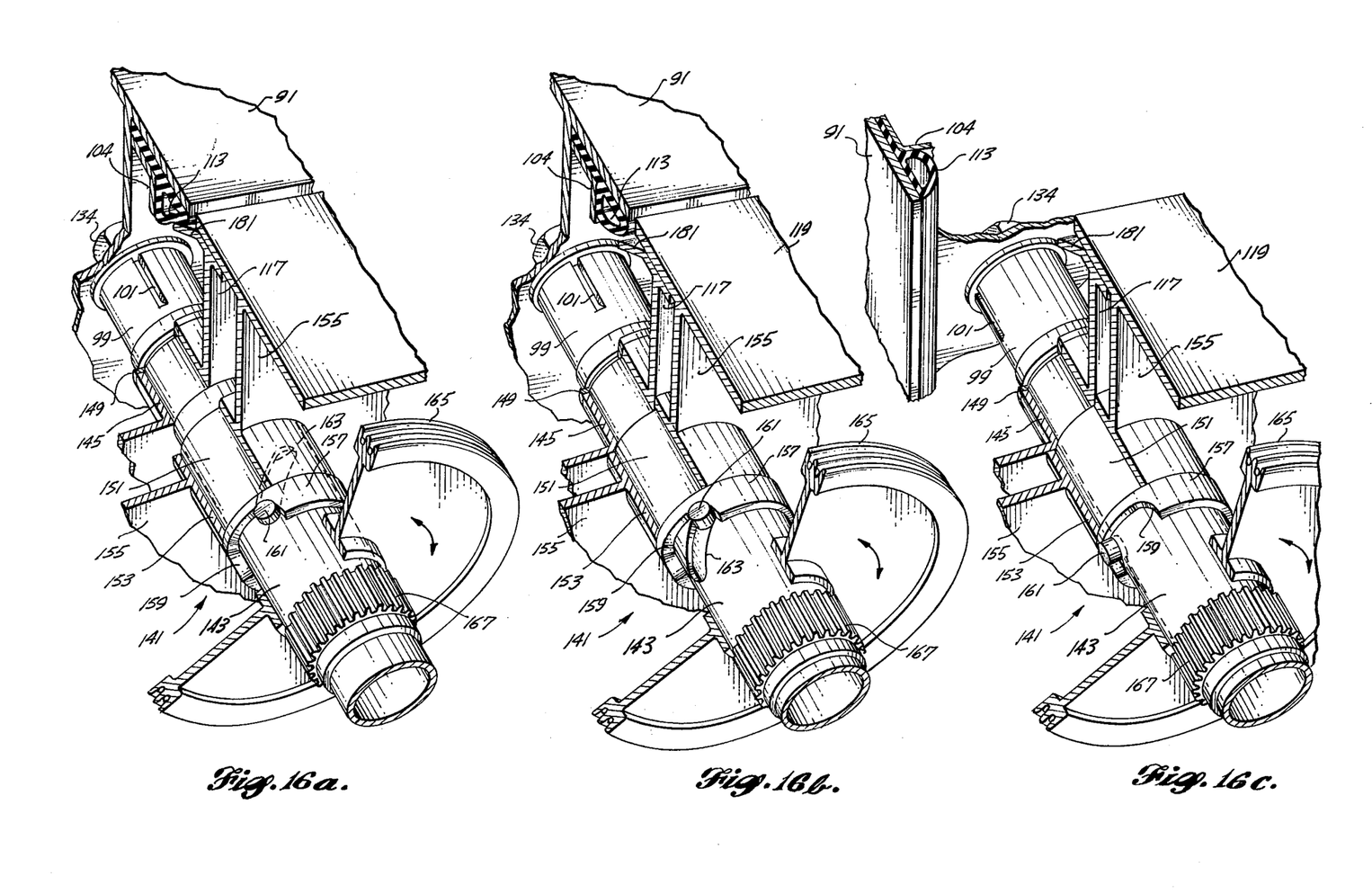
FIGS. 16a–16c are sequential perspective views of the mechanical mechanism illustrated in FIG. 13 and illustrate the movement of an end sealing plate into and out of sealing relationship with associated cascade elements, and the movement of the associated cascade elements between their closed and open positions.

As previously noted, a movable end plate 117 is movable into and out of the recess formed by the recessed ends of a plurality of cascade elements when the cascade elements are in their closed position. FIG. 13 is a cross-sectional diagram of a movement mechanism 141 for both moving an end plate 117 and rotating an associated cascade element 91 (or 93). FIGS. 16a, 16b and 16c are a sequence of perspective views, partially in cross-section, illustrating the operation of the movement mechanism 141.

The movement mechanism 141 comprises a sleeve 143 rotatably mounted on the shaft 99 of the associated cascade element 91, beyond the keyway 101. The plate 117 includes a collar 145 in which the sleeve 143 is rotatably mounted. The plate collar 145 is located at the end of the sleeve nearest the cascade element 91. A shoulder 147 formed in the outer surface of the sleeve 143 impinges against one side of the plate collar 145, and a snap-ring 149, mounted in an indentation formed in the end of the sleeve 143, impinges on the other side of the plate collar. Thus, the shoulder 147 and the snap-ring 149 prevent longitudinal movement of the end plate 117 with respect to the sleeve 143.

Moving to the right as viewed in the drawings, mounted on the sleeve 143 is cam collar 151. The cam collar 151 is rotatably mounted in a support collar 153 forming part of a support bracket 155. The support bracket 155 is affixed to the frame 119 forming a portion of the cascade window. The cam collar 151 includes a shoulder that impinges on the rightmost end of the support collar 153. As best seen in FIGS. 16a–16c, the rightmost end 157 of the cam collar 151 includes a pair of opposed indentations 159 (only one of which is viewable in FIGS. 16a–16c).

A pin 161 passes through aligned, orthogonally located, pin sized apertures, formed in the shaft 99, and through elongated transverse slots 163 formed in the sleeve 143. The ends of the pin 161 lie in the indentations 159 formed in the cam collar 151. As will be better understood from the following description, the transverse slots 163 cause longitudinal movement of the sleeve 143 and the end plate 117, with respect to the shaft 99, when a driving force is applied to the sleeve. A surrounding collar 158, only viewable in FIG. 13, prevents transverse movement of the pin 161 with respect to the shaft.

Affixed to the sleeve 143, on the side of the pin remote from the cascade element 91, is a pulley 165. Formed in the outer surface of the sleeve 143, beyond the pulley 165, are gear teeth 167. The gear teeth 167 are relatively long so as to remain coupled to a drive gear 169 as the sleeve 143 is moved back and forth in the manner hereinafter described. The drive gear 169 is mounted on a shaft 171. An idler gear 173 is mounted on the other end of the shaft 171 and engages a motor driven gear 175. The motor driven gear 175 is driven by a bidirectional motor 179 which may be electrically, pneumatically, or hydraulically energized. In any event, the motor 179 is adapted, through the gears, to rotate the sleeve 143.

Turning now to a description of the operation of the plate movement and cascade element rotational mechanism 141 illustrated in FIGS. 13 and 16a–16c; initially, for descriptive purposes, it is assumed that the end plate 117 is in its sealing position (FIG. 16a). In this position, flanges 181 projecting into the cascade element recesses about the periphery thereof, from the sealing plate 117, impinge on the bulbous portions of the seal elements 102 and 114. This impingement presses the bulbous portions 113 and 115 of the seal elements against the inward projecting flanges 104, forming a seal and lock.

When it is desired to move the cascade elements to their open position, the motor 179 is energized, causing the sleeve 143 to rotate in a clockwise direction, as viewed in FIGS. 16a–16c. Initial rotary motion of the sleeve does not cause rotary motion of the cascade element; rather initial rotary motion of the sleeve causes the sleeve and the end plate to translate along the longitudinal axis of the shaft. More specifically, initially, the end plate flange 181 is impinging on the bulbous portions of the cascade seals 102 and 114, preventing rotational movement of the cascade elements. However, the rotary motion of the sleeve 143 does have an outlet in the form of translational movement along the longitudinal axis of the shaft, as the pin 161 follows the transverse slot 163. This movement causes the end plate 117 to be withdrawn from its sealing position.

When the pin impinges on the end of the transverse slot nearest the cascade element, translational movement ends. Continued rotation of the sleeve 143 is now transmitted to the shaft 99 via the pin 161, causing the associated cascade element to move from its closed position to its open position. During this period of time, the pin 161 moves in the indentations 159 formed in the end of the cam collar. When the cascade element is fully open, the pin 161 reaches the other ends of the indentations 159 formed in the cam collar 157. At this point, the entire opening sequence is complete.

The closing sequence is the reversal of the opening sequence. Specifically, the end plate 117 and the cascade element 91 start in the position illustrated in FIG. 16c. The pin 161 first returns to the other end of the indentations 159 as the sleeve 143 rotates the shaft 99. This action causes the associated cascade element 91 to move to its closed position (FIG. 16b). Thereafter, continued counterclockwise rotation of the sleeve 143 does not cause further rotation of the shaft 99 because impingement of the arms of one cascade element on its adjacent element prevents such movement. Rather, the sleeve 143 translates along the axis of the shaft 99 as the pin follows the transverse slot 163. Translational movement of the sleeve returns the end plate 117 to its sealing and cascade locking position (FIG. 16a).

While various arcuate distances could be encompassed by the transverse slot 163, preferably it covers 72°, the 72° rotational movement causing the end plate to move one-quarter (¼) inch. The indentations on the other hand, preferably, are 90° long, i.e., they cover an arcuate distance of 90°, whereby the illustrated, associated cascade element is rotatable through an arc of 90°. In this regard, it should be noted that the arcuate distance could be more or less than 90°, depending upon the environment of use.

Figures 14, 15:
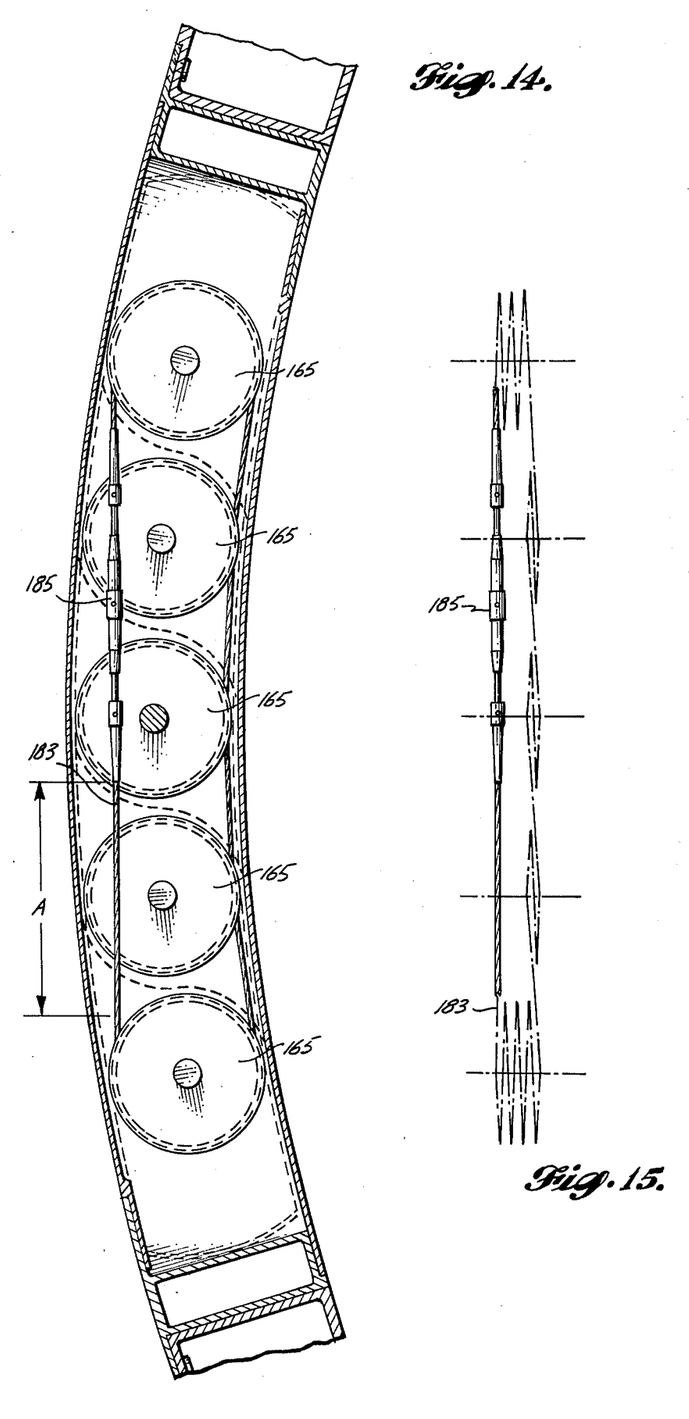
FIG. 14 is an elevational view of a coupling mechanism formed in accordance with the invention for coupling cascade elements forming a cascade window together so that they can be operated in unison by a common drive source.
FIG. 15 is a schematic view of the mechanism illustrated in FIG. 14.

FIGS. 14 and 15 illustrate the interconnection mechanism for connecting together a plurality of pulleys 165. Five pulleys are illustrated in both figures. They are connected together by a cable 183 wrapped about their outer peripheral surfaces. The cable 183 is wrapped at least twice around each pulley 165, the end pulleys having a plurality of additional wraps. A tightening mechanism 185 is mounted in the cable 183 and provides for tightening the cable so that an adequate amount of friction will exist between the cables and the pulleys. It is pointed out that the cable must have a movement distance A (FIG. 14) adequate to allow the pulleys to each rotate through an angle of approximately 180°. Obviously, only one power source is needed to rotate the entire chain of pulleys, and their respective cascade elements. Further, the cable 163 is dead-ended in each pulley to prevent any slippage from occurring. For example, one side of the pulley could be swagged on a ball, the other side having a suitable matching depression.

Figure 17:
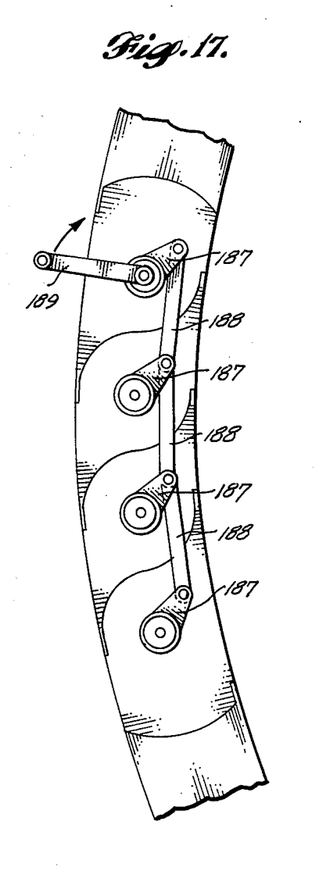
FIG. 17 is an elevational view of an alternative coupling mechanism formed in accordance with the invention for coupling the cascade elements forming a cascade window together so that they can be operated by a common drive source.

FIG. 17 is an illustration of an alternate mechanism for coupling a plurality of cascade elements together so that they can be rotatable by a common power source. Rather than pulleys and a cable, FIG. 17 illustrates a plurality of arms 187, one affixed to and projecting outwardly from each movable sleeve. The arms 187 are connected together by links 188 and one of the sleeves is pinned to a crank arm 189. The crank arm is adapted to be moved by a suitable power source, such as an actuator. Movement of the crank arm 189 moves the other arms 187 via the links 188.

Figure 18:
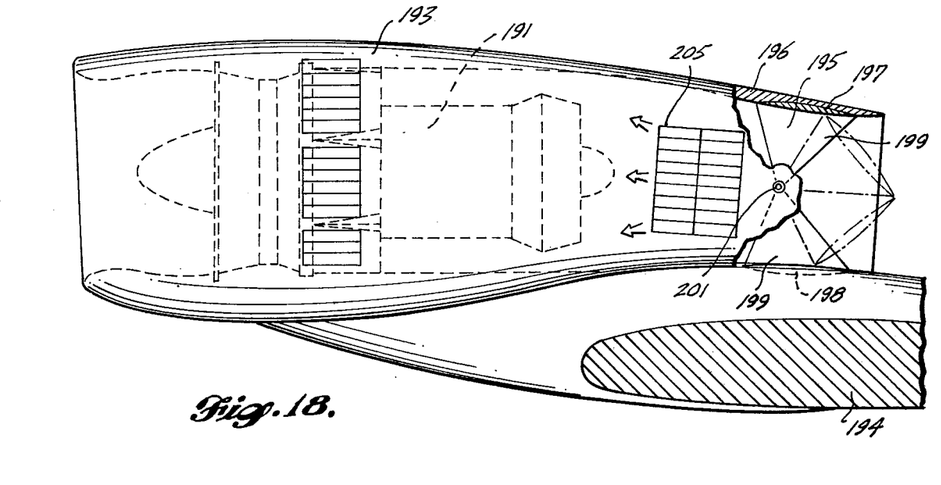
FIG. 18 is a partially cut away, side-elevational view of an over-the-wing mounted turbofan jet engine arrangement employing the present invention.
Figure 19:
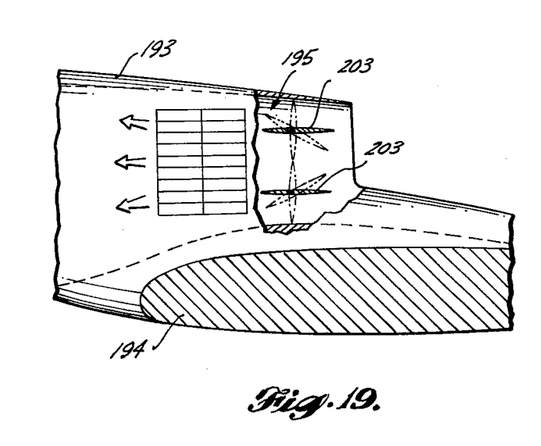
FIG. 19 is a partially cut away, side-elevational view of an alternate over-the-wing mounted turbofan jet engine arrangement employing the present invention.

FIGS. 18 and 19 illustrate upper-surface-blowing-type aircraft arrangements wherein an engine 191, mounted in a nacelle 193, is located above and forwardly of a wing 194. The engine is located such that the engine exhaust passes over the upper surface of the wing. As will be understood by those skilled in the art, the emitted exhaust flow deflects downwardly over relatively large flaps, in accordance with the Coanda effect, and creates a lift component that augments aerodynamic lift. In some such aircraft an exhaust closure mechanism 195 is located near the exhaust opening of the nacelle surrounding the engine 191. In the case of FIG. 18, the closure means 195 comprises upper and lower buckets 197 and 198 mounted on support arms 199. The support arms are rotatably affixed, at their other ends, to the nacelle 193 by pins 201. Rotation of the buckets together closes the exhaust opening of the nacelle 193. FIG. 19 illustrates a pair of aligned butterfly-type flaps or valve elements 203 mounted in the nacelle 193, near its exhaust end. Movement of the valve elements to a vertical position closes the exhaust opening. It should be noted that the nacelle exhaust opening of upper surface blowing engines is usually somewhat rectangular, rather than circular. The cascade windows 205 are utilized in combination with exhaust opening closure mechanism similar to those illustrated. The cascade windows 205 are mounted in the nacelle just forward of the closure mechanisms and open in the described manner as their associated nacelle exhaust closure mechanism closes the exhaust opening of the nacelle. In this manner, a mixed (fan and primary) air flow thrust reverser is formed.

It will be appreciated from the foregoing description that the invention provides new and improved jet engine thrust reversers. In general, the invention provides one or more cascade windows that may or may not be used with a fan air duct blocker section formed in accordance with the invention. The cascade windows include cascade elements that are rotatable between closed and opened positions. The cascade elements are designed such that they give a maximum amount of exhaust opening area for the amount of nacelle area they cover. Specifically, because the cascade elements are contiguous (i.e., they are not separated by structural components), when in their open position, the maximum sized opening is provided. In this regard, if the cascade elements were spaced from one another as, for example, are the cascade elements proposed in U.S. patent application Ser. No. 521,264, noted above, the amount of exhaust area for a specific overall cascade window size would be less. Consequently, the "S-shaped" configuration of the cascade elements of the invention provides a physical advantage not achieved by somewhat similarly designed cascade elements. In addition, the invention provides a sealing arrangement that prevents the passage of air around and through the cascade elements when they are in their closed position. Yet, the sealing arrangement is such that the cascade windows can be vented to reduce the pressure on the cascade elements prior to their being opened. Further, a unique mechanism for sealing the ends of a plurality of cascade elements is provided by the invention.

In addition to the cascade windows, the invention also provides a unique fan air duct blocker section. The fan air duct blocker section is formed of an uncomplicated arrangement whereby the fan air duct can be readily and quickly blocked when thrust reversal is desired. It should be noted that the fan air duct blocker doors can be used with the cascade windows of the invention, or with other types of cascade arrangements. Moreover, the cascade windows can be used with other types of fan air duct blocking mechanisms.

While a preferred embodiment of the invention has been illustrated and described, it will be appreciated by those skilled in the art and others that various changes can be made therein without departing from the spirit and scope of the invention. Hence, the invention can be practiced otherwise than as specifically described herein.

The embodiments of the invention in which an exclusive property or privilege is claimed are defined as follows:

1. A cascade window suitable for use in jet engines and the like to reverse the direction of flow of a gas, such as air, flowing in a duct, said cascade window comprising:

a frame suitable for supporting a plurality of elongated cascade elements;

a plurality of elongated cascade elements rotationally mounted in said frame, each of said cascade elements comprising a pair of elongated, spaced panels defining, and lying on either side of a longitudinal axis, and a plurality of vanes mounted between said spaced panels, said panels and vanes defining passageways suitable for directing a gas, such as air, in a desired direction, said plurality of elongated cascade elements monted side-by-side in said frame such that adjacent cascade elements abut one another;

seal means mounted in the regions where said elongated cascade elements abut one another; and, power means connected to said plurality of elongated cascade elements for simultaneously rotating said plurality of elongated cascade elements between an open position whereat said passageways defined by said panels and vanes allow said gas to pass through said cascade window and a closed position whereat said panels prevent said gas from flowing through said cascade window.

2. A cascade window as claimed in claim 1 wherein at least some of said cascade elements are S-shaped when viewed in a cross-sectional plane orthogonal to said longitudinal axis.

3. A cascade window as claimed in claim 2 including end sealing means for sealing said cascade window about the ends of said elongated cascade elements when said elongated cascade elements are in said closed position.

4. A cascade window as claimed in claim 3 wherein said end sealing means comprises: a recess formed in the ends of said cascade elements; seal elements mounted in the recessed ends of said cascade elements; and, an end sealing plate movable between a sealing position whereat said end sealing plate is in contact with said seal elements and seals the ends of said cascade elements and a nonsealing position whereat said sealing plate is out of contact with said seals.

5. A cascade window as claimed in claim 4 wherein said power means includes a mechanical mechanism for: (1) moving said end sealing plate between said sealing and said nonsealing positions; and, (2) rotating said elongated cascade elements between said open and closed positions.

6. A cascade window as claimed in claim 5 wherein: each of said elongated cascade elements includes a shaft extending outwardly from one end along its respective longitudinal axis; and said mechanical mechanism comprises a plurality of sleeves, one mounted on the shaft of each of said elongated cascade elements, said sleeves adapted to move longitudinally with respect to said shafts and rotationally with said shafts, said end plate being mounted on said sleeves in a manner such that said end plate is moved longitudinally with respect to said shaft when said sleeves are moved longitudinally with respect to said shafts.

7. A cascade window as claimed in claim 6 including an adjustment mechanism for separately adjusting the rotational position of each of said plurality of elongated cascade elements with respect to the others of said plurality of elongated cascade elements.

8. A cascade window as claimed in claim 1 including end sealing means for sealing said cascade window about the ends of said elongated cascade elements when said elongated cascade elements are in said closed position.

9. A cascade window as claimed in claim 8 wherein said end sealing means comprises: a recess formed in the ends of said cascade elements; seal elements mounted in the recessed ends of said cascade elements; and, an end sealing plate movable between a sealing position whereat said end sealing plate is in contact with said seal elements and seals the ends of said cascade elements and a nonsealing position whereat said sealing plate is out of contact with said seals.

10. A cascade window as claimed in claim 1 including an adjustment mechanism for separately adjusting the rotational position of each of said plurality of elongated cascade elements with respect to the others of said plurality of elongated cascade elements.

11. In a jet engine thrust reverser wherein a plurality of cascade elements are rotated between an open position whereat said cascade elements provide passageways for the thrust emitted by a jet engine to be reversed and a closed position whereat said cascade elements prevent the reversal of the thrust of said jet engine, the improvement comprising a plurality of cascade elements adapted to be rotated between said closed and open positions about longitudinal axes, at least some of said cascade elements including outwardly projecting arms and S-shaped in cross-sectional configurations, said cascade elements mounted in a manner such that adjacent cascade elements are in a side-by-side abutting position whereby said outwardly projecting arms of one cascade element overlap adjacent cascade elements when said cascade elements are in their closed position; said improvement further comprising seals located between the overlapping arms of said cascade elements and an end sealing means for sealing the ends of said plurality of cascade elements lying transverse to their longitudinal axes of rotation.

12. The improvement claimed in claim 11 wherein said end sealing means comprises: a recess formed in the ends of said cascade elements; seal elements mounted in the recessed ends of said cascade elements; and, an end sealing plate movable between a sealing position whereat said end sealing plate is in contact with said seal elements and seals the ends of said cascade elements and a nonsealing position whereat said sealing plate is out of contact with said seals.

13. The improvement claimed in claim 12 including a mechanical mechanism for: (1) moving said end sealing plate between said sealing and said nonsealing positions; and, (2) rotating said cascade elements between said open and closed positions.

14. The improvement claimed in claim 13 including an adjustment mechanism for separately adjusting the rotational position of each of said plurality of elongated cascade elements with respect to the others of said plurality of elongated cascade elements.

15. The improvement claimed in claim 11 including an adjustment mechanism for separately adjusting the rotational position of each of said plurality of elongated cascade elements with respect to the others of said plurality of elongated cascade elements.

16. A blocker door mechanism suitable for use in combination with a fan jet engine housed in a nacelle to block the fan air duct formed between the nacelle and the high pressure section housing said fan jet engine, said blocker door mechanism comprising:

a plurality of blocker doors lying adjacent to one another along spaced, facing edges and movable between a closed position whereat said blocker doors form a portion of the inner wall of said nacelle and an open position whereat said blocker doors block said fan air duct, said blocker doors including longitudinal slots formed in said spaced, facing edges;

movement means connected to said blocker doors for moving said blocker doors between said closed and open positions; and, intermediate doors located between adjacent ones of said blocker doors, said intermediate doors lying in said longitudinal slots formed in said spaced, facing edges of said blocker doors in a manner such that said intermediate doors fill the spaces between said blocker doors, said intermediate doors transversely movable in and out of said slots in a manner such that the rear edge of said blocker door mechanism varies in peripheral distance as said blocker doors are moved between said closed and open positions.

17. A blocker door mechanism as claimed in claim 16 wherein said blocker doors have a trapezoidal configuration, the long edges of the parallel edges of said trapezoidal blocker doors all pointing toward the front of said nacelle, said trapezoidal blocker doors and said intermediate doors defining: (1) a ring when said trapezoidal blocker doors are in said closed position; and, (2) a cone when said trapezoidal blocker doors are in said open position.

18. A blocker door mechanism as claimed in claim 17 including sealing means for sealing said intermediate doors in the slot regions where they join said trapezoidal blocker doors.

19. A thrust reverser for reversing the fan air flow of a fan jet engine comprising:
  1. a cascade section comprising at least one cascade window, said cascade window comprising:
    a. a frame suitable for supporting a plurality of cascade elements;
    b. a plurality of cascade elements rotatably mounted in said frame, each of said cascade elements comprising a pair of elongated spaced plates lying on either side of a longitudinal axis, a plurality of vanes affixed to said elongated spaced plates and lying transverse to said longitudinal axis whereby said spaced plates and said vanes define passageways; and
    c. power means connected to said plurality of cascade elements for simultaneously rotating said plurality of cascade elements between an open position whereat said passageways allow fan air to flow through said cascade window and a closed position whereat said cascade elements prevent fan air from flowing through said cascade window; and
  2. a fan duct blocking section comprising:
    a. a plurality of blocker doors movable between a closed position whereat said blocker doors prevent air from flowing from said fan air duct to said at least one cascade window and an open position whereat said blocker doors allow air to flow from said fan air duct to said at least one cascade window and, simultaneously, block said fan air duct rearwardly of said at least one cascade window;
    b. a plurality of intermediate doors located between said blocker doors, said intermediate doors adapted to allow the peripheral distance of the rear edge of said blocker door section to change as said blocker door section is moved between said open and closed positions; and
    c. actuating means for moving said blocker doors between said open and closed positions.

20. A thrust reverser as claimed in claim 19 wherein said cascade elements are S-shaped in cross-sectional configuration and are mounted such that adjacent cascade elements abut one another and such that the outwardly extending arms defined by said S-shaped cross-sectional configuration of one cascade element overlie adjacent cascade elements when said cascade elements are in their closed position.

21. A thrust reverser as claimed in claim 20 including end sealing means for sealing said cascade window about the ends of said elongated cascade elements when said elongated cascade elements are in said closed position.

22. A thrust reverser as claimed in claim 21 wherein said end sealing means comprises: a recess formed in the ends of said cascade elements; seal elements mounted in the recessed ends of said cascade elements; and, an end sealing plate movable between a sealing position whereat said end sealing plate is in contact with said seal elements and seals the ends of said cascade elements and a nonsealing position whereat said sealing plate is out of contact with said seals.

23. A thrust reverser as claimed in claim 22 wherein said power means includes a mechanical mechanism for: (1) moving said end sealing plate between said sealing and said nonsealing positions; and, (2) rotating said elongated cascade elements between said open and closed positions.

24. A thrust reverser as claimed in claim 23 wherein: each of said elongated cascade elements includes a shaft extending outwardly from one end along its respective longitudinal axis; and said mechanical mechanism comprises a plurality of sleeves, one mounted on the shaft of each of said elongated cascade elements, said sleeves adapted to move longitudinally with respect to said shafts and rotationally with said shafts, said end plate being mounted on said sleeves in a manner such that said end plate is moved longitudinally with respect to said shaft when said sleeves are moved longitudinally with respect to said shafts.

25. A thrust reverser as claimed in claim 20 including an adjustment mechanism for separately adjusting the rotational position of each of said plurality of elongated cascade elements with respect to the others of said plurality of elongated cascade elements.

26. A thrust reverser as claimed in claim 19 wherein said blocker doors have a trapezoidal configuration, the long sides of said trapezoidal blocker doors all lying toward the front of said nacelle, and wherein said intermediate doors are located between said trapezoidal blocker doors in a manner such that said intermediate doors fill the gaps between said trapezoidal blocker doors, said trapezoidal blocker doors and said intermediate doors defining: (1) a ring when said trapezoidal blocker doors are in said closed position; and, (2) a cone when said trapezoidal blocker doors are in said open position.

27. A thrust reverser as claimed in claim 26 wherein said intermediate doors lie in slots formed in said trapezoidal blocker doors; and, including sealing means for sealing said intermediate doors in the slot regions where they meet said trapezoidal blocker doors.

28. A thrust reverser as claimed in claim 26 wherein said intermediate doors are accordion doors adapted to fold outwardly toward said nacelle as said trapezoidal blocker doors are moved between said closed and open positions.

29. A blocker door mechanism as claimed in claim 18 wherein each of said intermediate doors is formed of two generally triangular sections, said generally triangular sections meeting along adjacent edges; and, each of said intermediate doors including a flexible joint connecting said triangular sections of said intermediate doors together along said adjacent edges.

30. A blocker door mechanism as claimed in claim 29 wherein said sealing means comprises an elastomeric sheet wrapped about said intermediate doors at least in the regions where said intermediate doors lie in said slots in said trapezoidal blocker doors.

31. A blocker door mechanism suitable for use in combination with a fan jet engine housed in a nacelle to block the fan air duct formed between the nacelle and the high pressure section housing of said fan jet engine, said blocker door mechanism comprising:

a plurality of trapezoidal blocker doors mounted such that said plurality of trapezoidal blocker doors lie adjacent to one another along spaced, facing edges, and the long edges of said parallel edges of said trapezoidal blocker doors point toward the front of said nacelle, said plurality of trapezoidal blocker doors being movable between a closed position whereat said blocker doors form a portion of the inner wall of said nacelle and an open position whereat said blocker doors block said fan air duct;

movement means connected to said plurality of blocker doors for moving said blocker doors between said closed and open positions;

intermediate doors located between adjacent ones of said blocker doors in a manner such that said intermediate doors fill the gaps between said trapezoidal blocker doors, said intermediate doors being accordion doors adapted to fold outwardly toward said nacelle as said trapezoidal blocker doors are moved between said closed and open positions, said intermediate doors movable in a manner such that the rear edge of said blocker door mechanism varies in peripheral distance as said blocker doors are moved between said closed and open positions such that said trapezoidal blocker doors and said intermediate doors define: (1) a ring when said trapezoidal blocker doors are in said closed position; and (2) a cone when said trapezoidal blocker doors are in said open position; and, sealing means for sealing joints formed in said intermediate doors and between said intermediate doors and said trapezoidal blocker doors, said sealing means comprising an elastomeric sheet extending across said intermediate doors between adjacent trapezoidal blocker doors.

32. A blocker door mechanism as claimed in claim 31 wherein said intermediate doors are formed of two generally triangular elements hinged together along an adjoining edge on the corner of said edge nearest said fan air duct and including hinges for attaching the edges of said intermediate doors to said trapezoidal doors along the corner of the adjacent edges nearest said fan air duct.

* * * * *